United States Patent
Frenkil

(10) Patent No.: US 8,529,287 B2
(45) Date of Patent: Sep. 10, 2013

(54) POWER SUPPLY CORD STORAGE MECHANISM

(76) Inventor: Leonard Frenkil, Baltimore, MD (US)

( * ) Notice: Subject to any disclaimer, the term of this patent is extended or adjusted under 35 U.S.C. 154(b) by 0 days.

(21) Appl. No.: 13/416,955

(22) Filed: Mar. 9, 2012

(65) Prior Publication Data

US 2012/0322297 A1 Dec. 20, 2012

Related U.S. Application Data

(63) Continuation-in-part of application No. 13/327,258, filed on Dec. 15, 2011.

(60) Provisional application No. 61/498,241, filed on Jun. 17, 2011.

(51) Int. Cl.
*H01R 13/72* (2006.01)

(52) U.S. Cl.
USPC ............................................. 439/501

(58) Field of Classification Search
USPC ............... 439/501, 502; 174/35; 242/405.2, 242/402, 406, 400.1; 191/24.2; 248/51
See application file for complete search history.

(56) References Cited

U.S. PATENT DOCUMENTS

| | | | | |
|---|---|---|---|---|
| D229,668 S | * | 12/1973 | Boone | D8/358 |
| 4,095,871 A | * | 6/1978 | Holte | 439/501 |
| 4,475,649 A | * | 10/1984 | Haarbosch | 206/702 |
| D294,487 S | * | 3/1988 | Bannigan | D13/137.4 |
| 4,778,125 A | * | 10/1988 | Hu | 242/405.2 |
| 5,507,667 A | | 4/1996 | Hahn et al. | |
| 5,782,649 A | * | 7/1998 | Aiken | 439/369 |
| D400,175 S | * | 10/1998 | Okamoto | D13/139.7 |
| 5,819,894 A | * | 10/1998 | Okamoto | 191/12.4 |
| 5,984,224 A | * | 11/1999 | Yang | 242/400.1 |
| 6,286,777 B1 | * | 9/2001 | Black | 242/388.6 |
| 6,331,936 B1 | | 12/2001 | Hom et al. | |
| 6,361,368 B1 | | 3/2002 | Tseng | |
| 6,428,348 B1 | | 8/2002 | Bean | |
| 6,450,436 B1 | * | 9/2002 | Tsuji et al. | 242/400.1 |
| 6,567,277 B1 | * | 5/2003 | Doherty et al. | 361/826 |

(Continued)

FOREIGN PATENT DOCUMENTS

| | | |
|---|---|---|
| DE | 197930003 U1 | 8/1981 |
| EP | 421906 A1 | 4/1991 |
| EP | 2086082 A1 | 8/2009 |

OTHER PUBLICATIONS

U.S. Non-Final Office Action for U.S. Appl. No. 13/327,258 dated Jun. 28, 2012, 12 pages.

(Continued)

*Primary Examiner* — Alexander Gilman
(74) *Attorney, Agent, or Firm* — Fish & Richardson P.C.

(57) ABSTRACT

An apparatus including at least two longitudinally extending guides configured to be coupled to opposite side surfaces of a power supply unit such that, when coupled to the power supply unit, the guides cooperate with the power supply unit to form a channel between the guides, at least one end of each of the guides defining a recess in the at least one end that is configured to receive and retain a part of a flexible portion of an electrical power cord and to cooperate with the power supply unit to retain the power cord in a wrapped arrangement substantially within the channel, and a retention element cooperating with the recess to receive and retain the part of the flexible portion of the electrical power cord.

21 Claims, 17 Drawing Sheets

(56) References Cited

U.S. PATENT DOCUMENTS

| | | |
|---|---|---|
| 6,636,432 B2 | 10/2003 | Chao |
| 6,698,560 B2 * | 3/2004 | Reardon et al. ............. 191/12 R |
| 6,740,817 B1 * | 5/2004 | Anderson ..................... 174/135 |
| 6,746,272 B2 | 6/2004 | Bean |
| 6,861,822 B2 | 3/2005 | Wei |
| 6,962,306 B2 * | 11/2005 | West .......................... 242/405.2 |
| 7,044,775 B2 * | 5/2006 | Yang ............................. 439/502 |
| 7,077,693 B1 * | 7/2006 | Symons ........................ 439/501 |
| 7,121,877 B2 * | 10/2006 | Lin ............................... 439/502 |
| 7,563,130 B2 | 7/2009 | Farrar et al. |
| 7,803,012 B2 * | 9/2010 | Shen et al. ................... 439/501 |
| 7,815,025 B2 * | 10/2010 | Chen et al. ................. 191/12 R |
| 7,871,291 B2 | 1/2011 | Tracy et al. |
| D649,017 S * | 11/2011 | Stieler ............................ D8/356 |
| D667,390 S * | 9/2012 | Matera ........................ D14/223 |
| 2003/0137810 A1 | 7/2003 | Chen |
| 2004/0097126 A1 | 5/2004 | Chen |
| 2004/0203277 A1 * | 10/2004 | Chien ........................... 439/501 |
| 2010/0139950 A1 * | 6/2010 | Chen ............................ 174/135 |

OTHER PUBLICATIONS

U.S. Final Office Action for U.S. Appl. No. 13/327,258 dated Jan. 11, 2013, 11 pages.

PCT Notification of Transmittal of the International Search Report and the Written Opinion for International Application No. PCT/US2012/041590 dated Jan. 30, 2013, 12 pages.

* cited by examiner

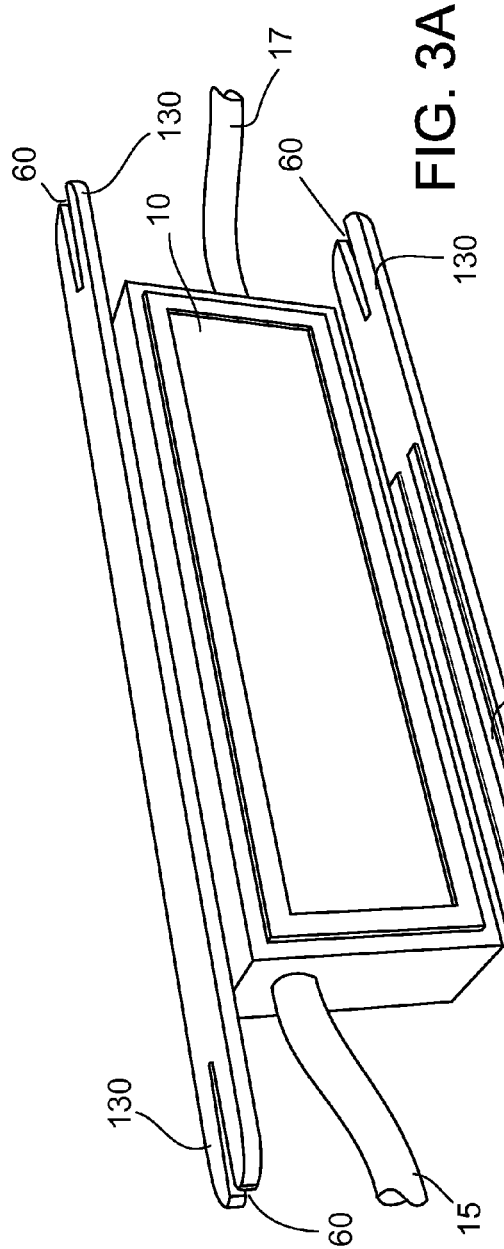
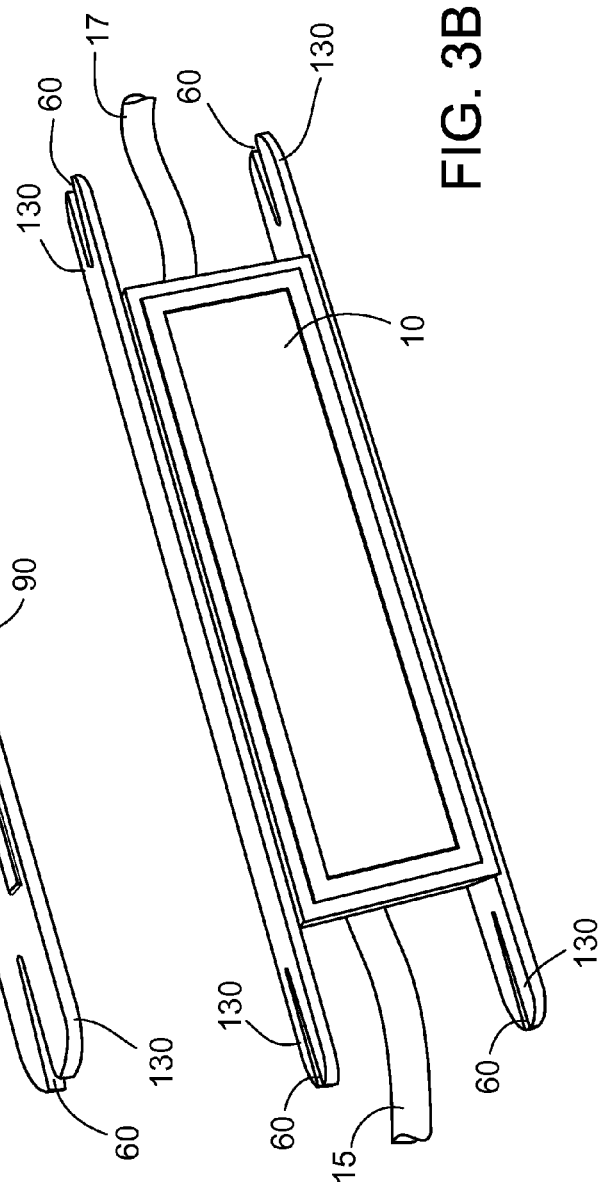

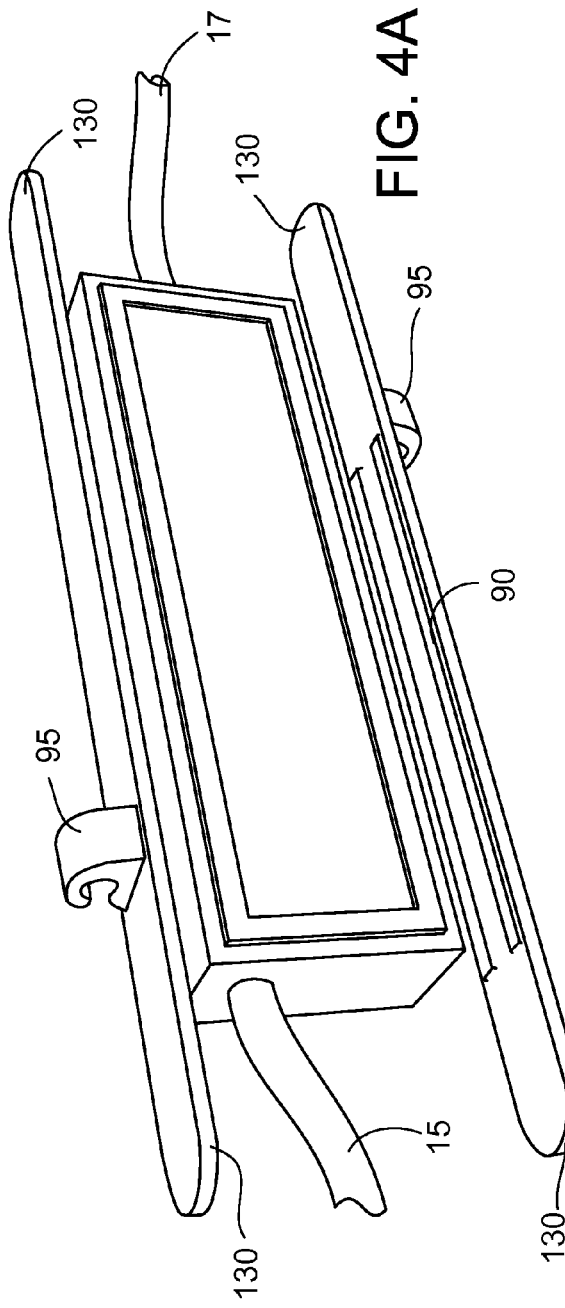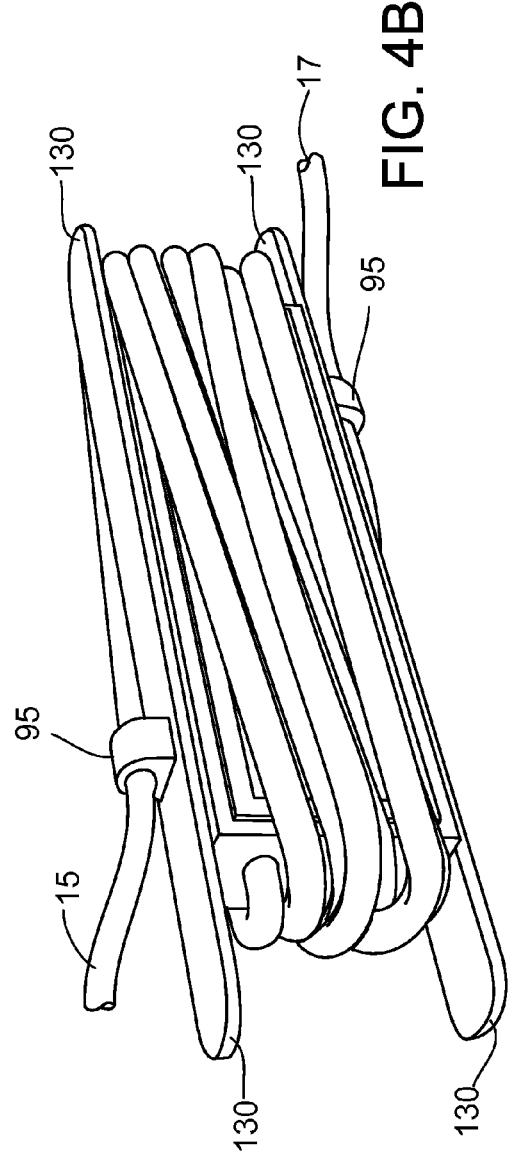

POWER SUPPLY CORD STORAGE MECHANISM

CROSS-REFERENCE TO RELATED APPLICATIONS

This application is a continuation-in-part application of U.S. application Ser. No. 13/327,258, filed Dec. 15, 2011, which claims priority to U.S. Provisional Application No. 61/498,241, filed Jun. 17, 2011, and titled "Power Supply Cord Storage." The entire contents of the aforementioned applications are incorporated herein by reference.

TECHNICAL FIELD

This disclosure relates to management and storage of power supply cords for electric and electronic devices.

BACKGROUND

Electric and electronic devices, such as computers, printers, displays, or other devices derive power from a domestic source, such as a 120 or 240 volt outlet or line. The power supply for providing power to these devices usually includes a power supply unit that transforms or modifies electrical energy and one or two associated power cords. The power cords usually include a high voltage line cord that couples to and derives power (typically AC) from a wall outlet and connects to the power supply unit, and an output line (typically lower voltage DC) that couples to the power supply unit and the electric or electronic devices to be driven by the converted electricity. When not in use, or when a user, for example, is traveling, a user will often wrap the power cords, around the power supply unit, for storage or management of the cords and power supply unit. However, these and other wrapping methods fail to facilitate the orderly wrapping or maintenance of the associated power cords, nor do they provide for the securing of the power cord ends. Invariably, the unsecured ends and the cords become loose and tangled or for lack of a readily usable storage solution, the power cords are simply left in a jumble to be untangled later. Typically, laptops and other power supply units are delivered with a "Velcro®-like" tape intended to secure the cords to the body of the power supply unit. This turns out to be an inefficient and mediocre solution to the problem at best and users then tend to ignore the tape or find it annoying and remove it.

SUMMARY

The disclosed implementations provide a simple, quick, and convenient means of managing the orderly use and storage of power cords of portable electric and electronic power supply units. It may be implemented in the initial manufacture and made a part of the power supply unit or it may be implemented retrospectively by being attached either releasably or permanently to the power supply unit body. The design assists in the maintenance of orderly control of the power cord(s) whether being extended partially or fully. For example, the recesses formed in the ends of the extensions or guides discussed herein allow capture of various sized power cords at any location along the flexible portion of the cord, so that if a user wants to shorten or lengthen the cord during use, the present implementations provide a quick, unique, and easy means of doing so.

In one general aspect, an apparatus includes a power supply unit, and a plurality of extensions extending outwardly from opposing side surfaces of the power supply unit, the extensions cooperating with the power supply unit to form a channel between the extensions, wherein at least one end of each of the plurality of extensions defines a recess in the at least one end that is configured to receive and retain a part of a flexible portion of an electrical power cord, and wherein the at least one end of each of the plurality of guides further defines retention mechanisms for retaining the part of the flexible portion of the electrical power cord within the recess.

Implementations can optionally include one or more of the following features. For example, the apparatus further includes a flexible element coupled to the retention mechanisms. The flexible element includes tips made from a rubber or a plastic. The tips are bonded to the retention mechanisms or the tips are formed integrally with the retention mechanisms. The flexible element includes a plurality of jackets made from a rubber or a plastic. Each of the plurality of jackets is configured to substantially surround a portion of one of a cooperating retention mechanism. The apparatus further includes a flexible element comprising a single jacket, the single jacket configured to substantially surround each of the retention mechanisms. The retention mechanisms comprise a first substantially linear portion extending substantially parallel to a longitudinal axis of the at least one of the plurality of extensions and a substantially curved portion terminating proximate to the linear portion. The substantially curved portion includes a first portion that extends substantially parallel to the longitudinal axis of the at least one of the plurality of extensions for a portion of its length and a second curved portion that extends for a portion of its length substantially perpendicular to the longitudinal axis of the at least one of the plurality of extensions before terminating in a portion that is substantially parallel to the longitudinal axis of the at least one of the plurality of extensions. The retention mechanisms include a first substantially curved portion extending from the at least one end of each of the plurality of extensions and a second raised portion extending from the at least one end of each of the plurality of extensions. The first substantially curved portion and the second raised portion cooperate to form a passageway in a side of the extension for receiving a part of the flexible portion of the electrical power cord. The retention mechanisms include a first portion having a longitudinally extending and a curved portion and a second portion having a longitudinally extending and a curved portion, the first and second portions extending from an end portion of the at least one end of each of the plurality of extensions and terminating proximate each other to form a passageway leading into an opening defined between the first and second portions. The apparatus further includes one or more grooves defined in an end portion of the at least end proximate the first and second portions. The one or more grooves are configured to permit the first or second portions to flex along or out of a plane defined by the at least one of the plurality of extensions In another general aspect, an apparatus includes at least two longitudinally extending guides configured to be coupled to opposite side surfaces of a power supply unit such that, when coupled to the power supply unit, the guides cooperate with the power supply unit to form a channel between the guides, at least one end of each of the guides defining a recess in the at least one end that is configured to receive and retain a part of a flexible portion of an electrical power cord and to cooperate with the power supply unit to retain the power cord in a wrapped arrangement substantially within the channel, and a retention element cooperating with the recess to receive and retain the part of the flexible portion of the electrical power cord.

Implementations can optionally include one or more of the following features. For example, the retention element includes a first portion having a longitudinally extending and a curved portion and a second portion having a longitudinally extending and a curved portion, the first and second portions extending from an end portion of the at least one end of each of the guides and terminating proximate each other to form a passageway leading into the recess between the first and second portions. The apparatus further includes one or more grooves defined in an end portion of the at least one end of each of the guides. The one or more grooves are configured to permit the first or second portions to flex along or out of a plane defined by the at least one of the guides. The retention element includes a textured surface disposed within the at least one end of each of the guides defining the recess. The retention element includes an insert defining a plurality of textured portions disposed within the at least one end of each of the guides. The insert is bonded to the at least one end of the guides or is formed integral with the at least one end of the guides. The retention element includes one of a clip, a tip, or a jacket. The tip or the jacket is formed from a flexible material. The flexible material includes rubber or plastic.

BRIEF DESCRIPTION OF THE DRAWINGS

FIGS. 3A and 3B illustrate another implementation of a cord wrap for a power supply unit.

DETAILED DESCRIPTION

Figure 1:
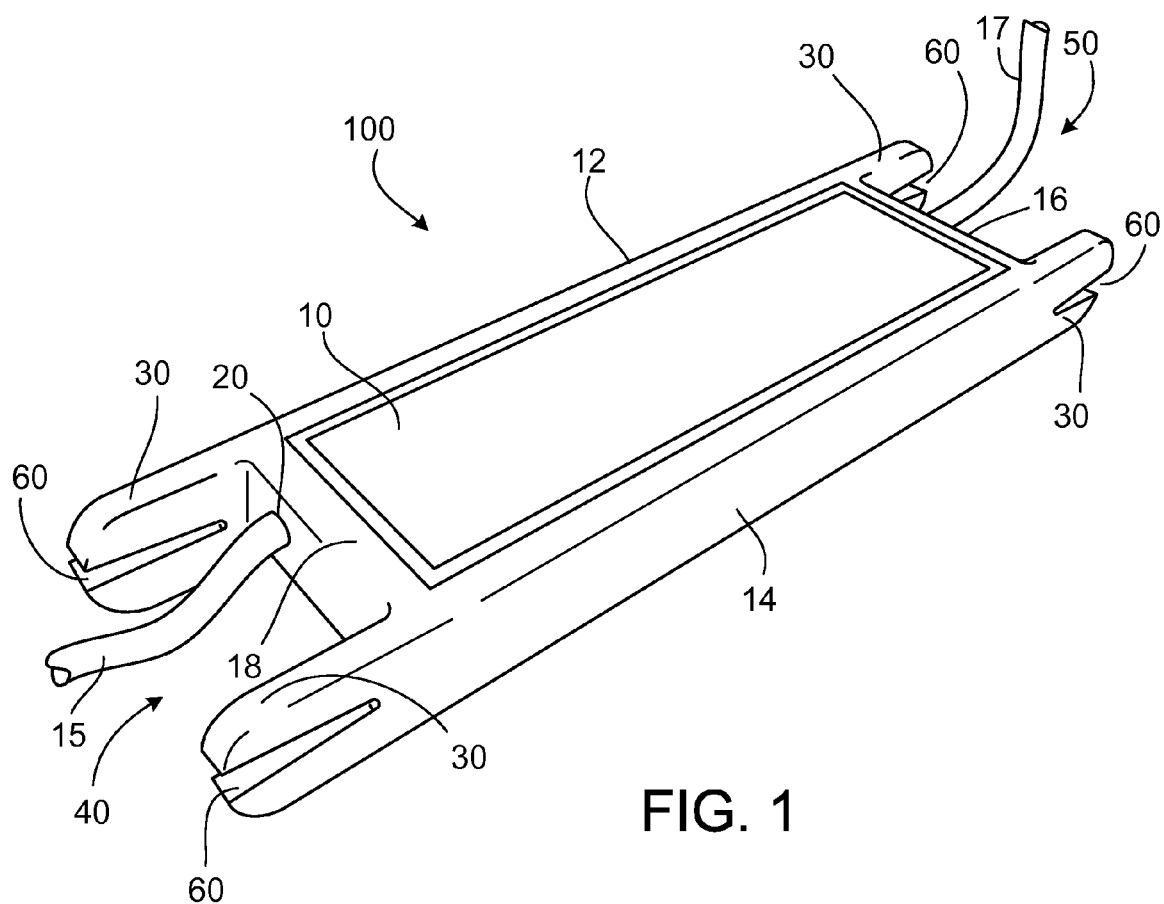
FIG. 1 illustrates an implementation of a cord wrap for a power supply unit.

Referring to the accompanying drawings in which like reference numbers indicate like elements, FIG. 1 illustrates an implementation of a cord wrap or cord caddy 100 for a power supply unit 10. Power supply unit 10 is used to provide electric power to any number of consumer electronic devices, such as computers, laptop computers, printers, displays, and other electric and electronic devices. A high voltage power cord 17 may be releasably connected at one of its ends to the power supply unit 10 at a port (not shown) formed in the power supply unit 10, and at an opposite of its ends to, for example, a wall outlet via common electrical prongs (not shown) formed at the end of the power cord 17. The high voltage power cord 17 delivers power from a domestic source, such as a 120 or 240 volt wall outlet to the power supply unit 10. A second low voltage power cord 15 may also be connected, or releasably connected, at one end to the power supply unit 10, such as for example to port 20 formed in the power supply unit 10, and at an opposite end of the cord 15 to a receiving port formed in the electronic device.

As shown in FIG. 1, the power supply unit 10 may include one or more extensions or guides 30. The extensions or guides 30 may be formed during, for example, the manufacture of the power supply unit 10 by extending opposite side surfaces 12, 14 in a longitudinal or transverse direction thereby forming guides 30 opposite one another at opposite ends 16, 18 of the power supply unit 10. Alternatively, the extensions or guides 30 may be permanently or releasably coupled to the power supply unit 10 after the unit 10 has been manufactured or during manufacture of the unit 10, as will be discussed in more detail below. The extensions or guides 30 may extend beyond the outer periphery of the power supply unit 10 for a desired length, for example, 25.4 mm to 50.8 mm (1 to 2 inches), depending upon the length of the high and low voltage power cords used. The extensions or guides 30 form channels or trough areas 40, 50 between them, respectively. The channel or trough areas 40, 50 generally conform to the width of the power supply unit 10.

Figure 2:
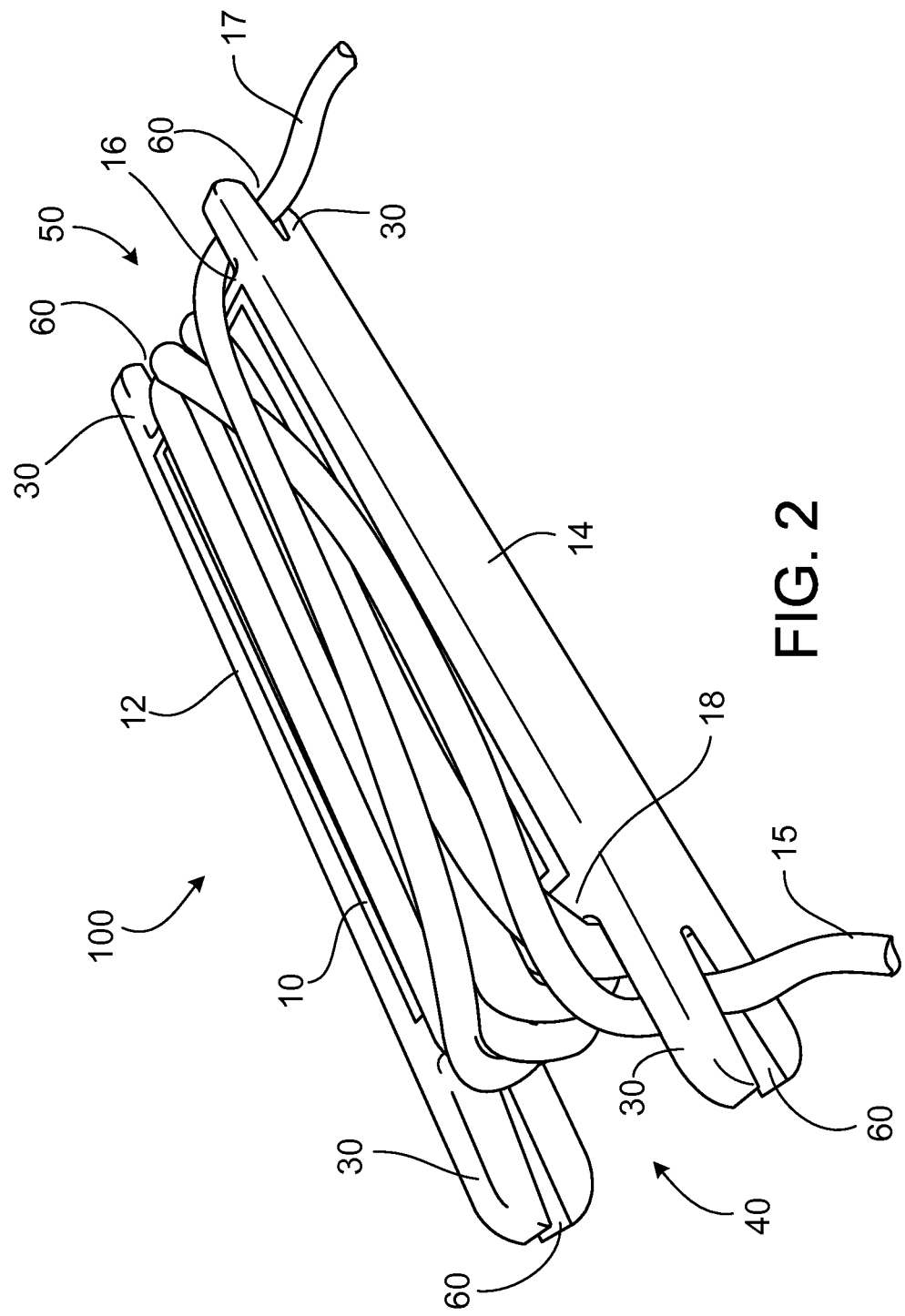
FIG. 2 illustrates the cord wrap of FIG. 1 with portions of the cords wrapped about the power supply unit.

Referring to FIG. 2, using the power supply unit 10 as a core or base, the high and low voltage cords 17, 15 connected to the power supply unit 10 may be wound around the power supply unit 10, for example, in a longitudinal or transverse direction around the power supply unit 10, such that the cords are held in place between the guides 30 at opposite ends of the power supply unit 10. In order to prevent the cords from unwinding, one or more of the extensions or guides 30 may include a recess, notch or other opening, such as wedge-shaped notches 60 formed in the extensions or guides 30. Once the power cords are wound around the power supply unit 10, end portions of the power cords may be inserted and wedged into the notches 60 to retain a portion of the cords in position. In order to remove the cords from the respective notches 60, a user simply has to pull the end portions of the power cords from the notches 60 at which point the user may unwind the cords from around the power supply unit 10 to the extent needed or desired.

Referring to FIGS. 3A and 3B, in addition to forming the extensions or guides 30 during manufacture of the power supply unit 10, the extensions or guides may be retrofit onto an existing power supply unit 10. For example, as shown in FIGS. 3A, B, the extensions or guides 130 may be formed separate from the power supply unit 10 in the form of strips having a length such that they extend beyond the ends of the power supply unit 10 by a desired amount (e.g., 25.4 mm to 50.8 mm (1 to 2 inches)). An adhesive material 90 such as glue, adhesive strips, hook and loop fasteners, such as Velcro®, or other suitable material may be provided along a length of the extensions or guides 130 as shown in FIG. 3A. Alternatively, the adhesive material 90 may be provided along a length of the side of the power supply unit 10. The guides 130 may be brought into contact with the respective sides of the power supply unit 10 in order to form the power cord wrap assembly as shown in FIG. 3B. The guides 130 may be shaped or configured to match or generally conform to the shape of the power supply unit 10. For example, a number of power supply units 10 have slightly-angled side surfaces due to the design of the casing of the power supply unit 10. In those instances, the guides 130 may be shaped, for example, with an angle that closely or substantially matches the angle of the side surface of the power supply unit 10 to assist in adhering the guides 130 to the power supply unit 10. In addition, the adhesive material 90 may be formed such that any space between the guides 130 and the side of the power supply unit 10 are taken up or absorbed by the adhesive material 90 when the guides 130 are brought into contact with the sides of the power supply unit 10. It should be understood that the guides 130 may have any suitable shape in order to conform to the shape of the power supply unit 10.

As also shown in FIGS. 3A, B, the guides 130 may also include notches or openings 60 as discussed above, or any of other suitable retention mechanisms for retaining a portion of the cords once the cords are wrapped about the power supply unit 10 for storage. Alternatively, the extensions or guides 130 may also include clips 95 (FIGS. 4A, B) made from a metal, plastic or other suitable material for securing a portion of the cords once the cords are wrapped around the power supply unit 10 to help prevent the cord from unwrapping. For example, once the cords are wrapped around the power supply unit 10, a portion of the cords may be snapped into place and received by the clips 95 (as shown in FIG. 4B).

Figure 3C:
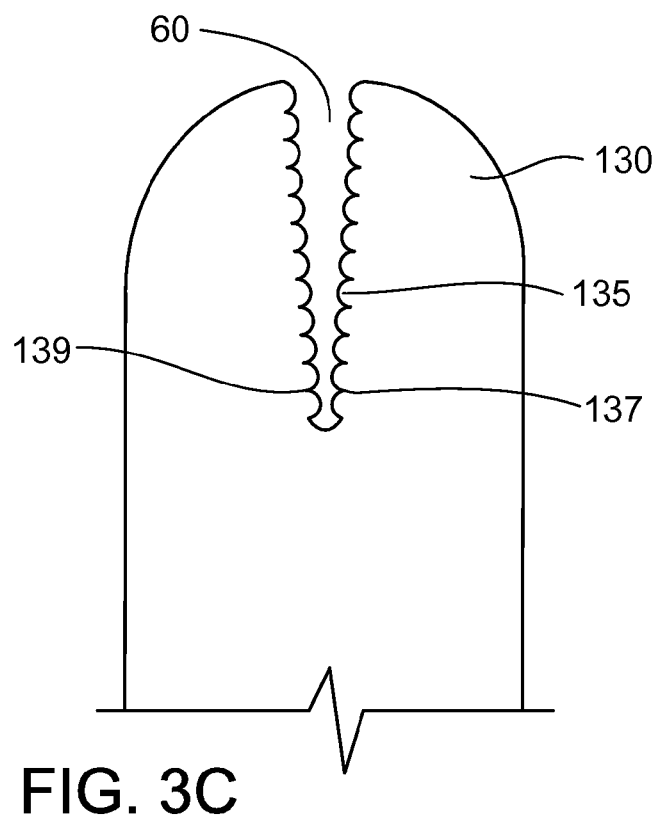
FIGS. 3C and 3D illustrate alternative implementations of the cord wrap of FIGS. 3A and 3B FIGS. 4A and 4B illustrate another implementation of a cord wrap for a power supply unit.
Figure 3D:
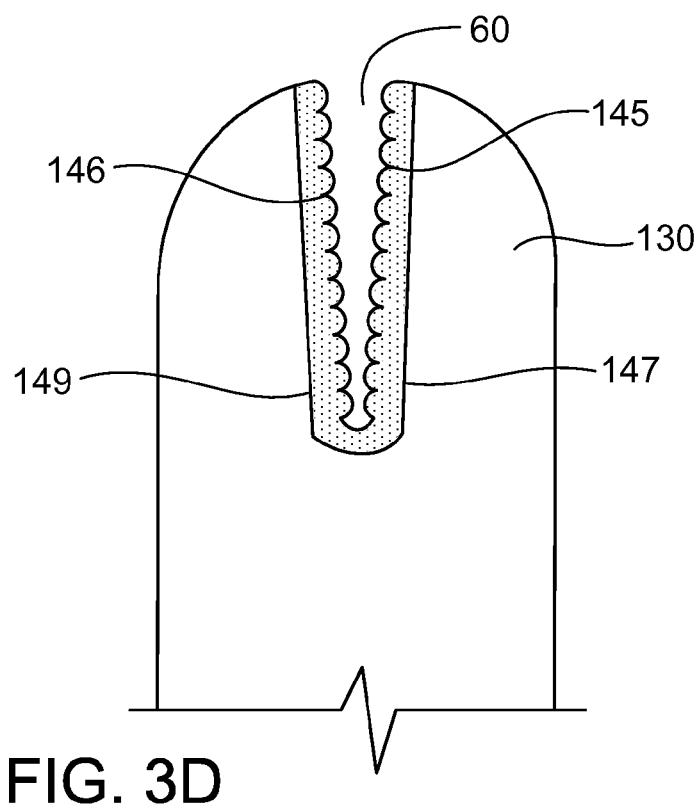

Referring to FIG. 3C, portions of the guide 130 forming the notches or openings 60 can include one or more scalloped or textured portions 135 formed along a length of opposing faces 137, 139 of the guide 130. The scalloped portions 135 assist in receiving and securing a portion of an electrical cord within the openings 60. Referring to FIG. 3D, portions of the guide 130 forming the notches or openings 60 can also include one or more scalloped or textured portions 145 formed along a length of opposing faces 147, 149 of the guide 130. The scalloped or textured portions 145 may be formed from an elastic or flexible material such as rubber, polymer, or other suitable materials such that the scalloped portions 145 may assist in receiving and securing a portion of the electrical code within the openings 60. The scalloped or textured portions 145 may be formed as part of an integral unit or insert 146 and then placed within the opening 60 formed in the end portions of the guide 130 (as shown in FIG. 3D) using an adhesive, sealant, or other forms of bonding to secure the portions 145 to the guide 130 within the opening 60. Alternatively, the integral unit 146 or portions 145 may be formed integrally with the guide 130.

Figure 5:
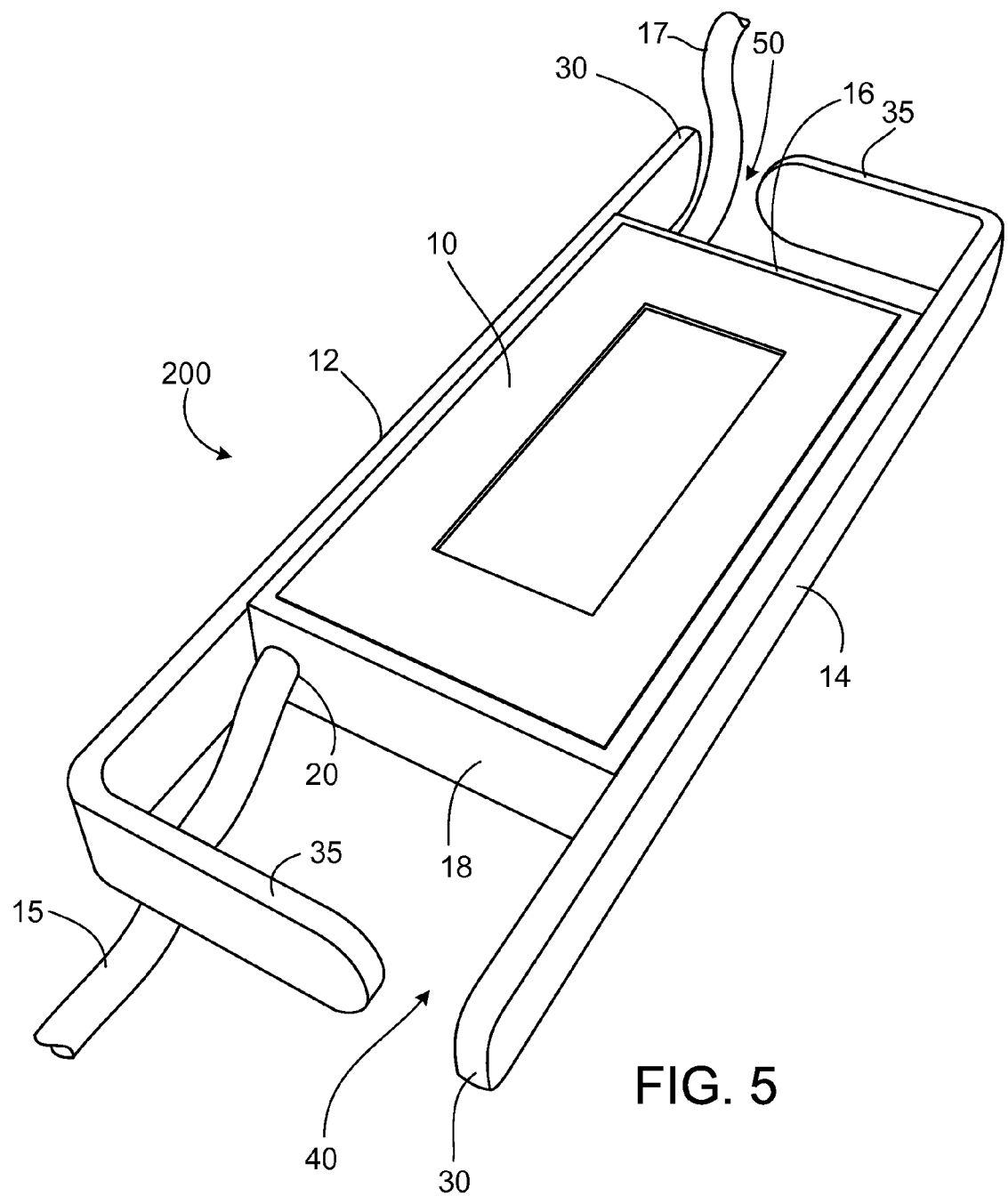
FIG. 5 illustrates another implementation of a cord wrap for a power supply unit.

Referring to FIG. 5, an alternative cord wrap 200 is shown. The power supply unit 10 may include one or more extensions or guides 30. The extensions or guides 30 may be formed during, for example, the manufacture of the power supply unit 10 by extending opposite side surfaces 12, 14 in a longitudinal or transverse direction thereby forming guides 30 opposite one another at opposite ends 16, 18 of the power supply unit 10. Alternatively, the extensions or guides 30 may be releasably coupled to the power supply unit 10 after the unit 10 has been manufactured or during manufacture of the unit 10. The extensions or guides 30 may extend beyond the outer periphery of the power supply unit 10 for a desired length, for example, 25.4 mm to 50.8 mm (1 to 2 inches), depending upon the length of the high and low voltage power cords 15, 17 used. The extensions or guides 30 form channels or trough areas 40, 50 between them, respectively. The channel or trough areas 40, 50 generally conform to the width of the power supply unit 10. In the implementation shown in FIG. 5, at least one end portion 35 of the extensions or guides 30 is formed in a substantially L-shaped configuration. The end portions 35 serve to further aid in retaining the wrapped cords 15, 17 in position around the periphery of the power supply unit 10. For example, as the cords 15, 17 are wrapped around the power supply unit 10, they tend to fill up the space formed by the channels or trough areas 40, 50. As the cords 15, 17 fill up the space, the outer portion of the wrapped cords 15, 17 may contact the end portions 35 such that the end portions 35 exert a force on the wrapped section of cords to help limit or prevent movement of the cords once the wrap is complete.

Figure 6:
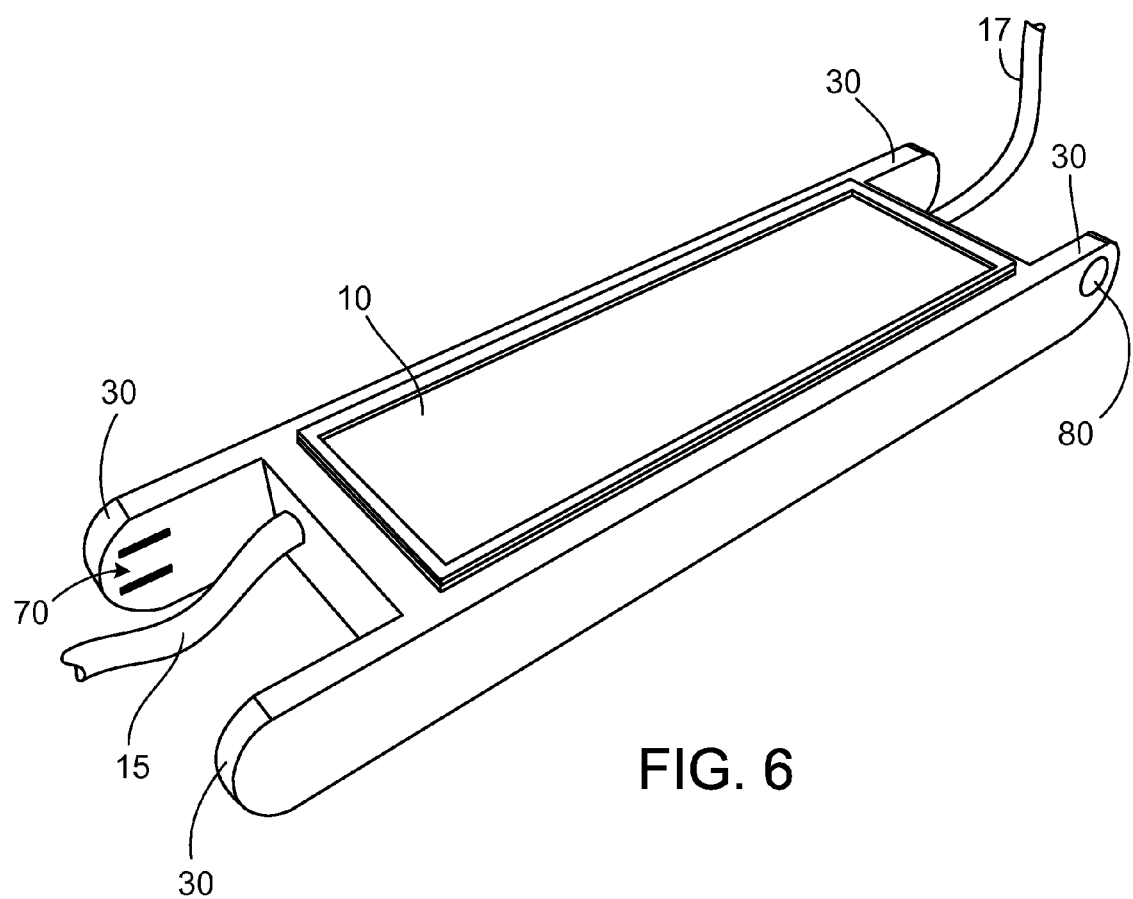
FIG. 6 illustrates another implementation of a cord wrap for a power supply unit.

FIG. 6 illustrates an alternative implementation for preventing the cords from unwinding once the cords 15, 17 are wrapped around the power supply unit 10. As illustrated in FIG. 6, one of the ends of the extensions or guides 30 may include one or more receptacles 70 formed in the shape and configuration of electrical prongs or plugs so that once the high voltage power cord 17 is wrapped around the power supply unit 10, the pronged or plugged end (not shown) of the power cord 17 may be plugged into the receptacles 70. Likewise, one of the ends of the extensions or guides 30 may include a hole or opening 80 formed to receive or mate with the connector end (not shown) of the low voltage power cord 15 once it is wrapped around the power supply unit 10. By receiving the respective ends of the power cords 15, 17, receptacles 70 and opening or hole 80 provide a convenient way of retaining the cords 15, 17 in a wrapped configuration around the power supply unit 10.

Figure 7:
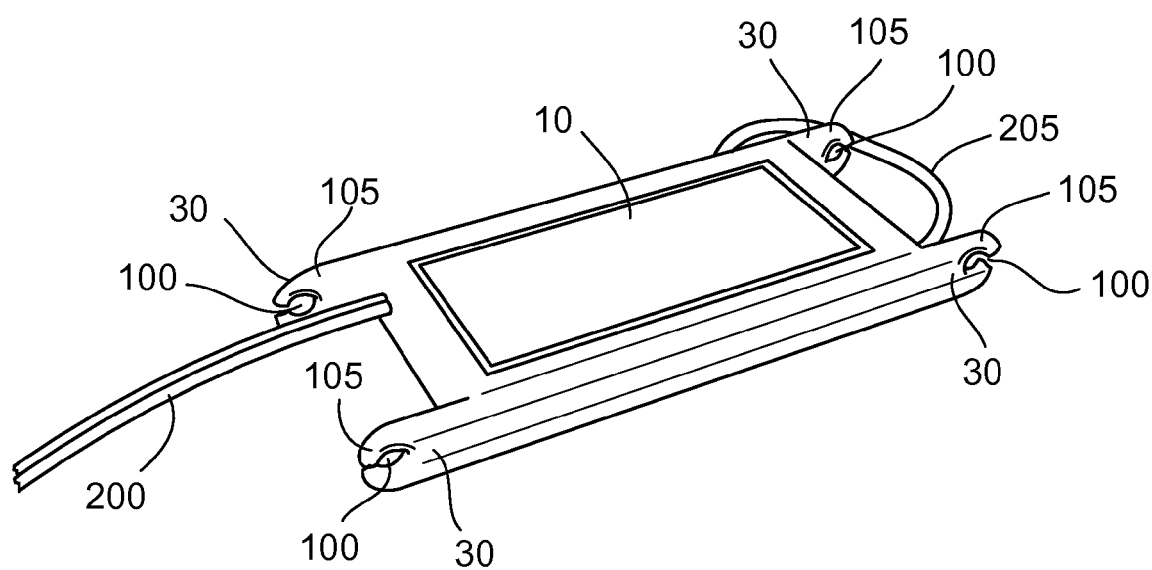
FIG. 7 illustrates another implementation of a cord wrap for a power supply unit.

FIG. 7 shows an implementation of the cord wrap with recesses formed in the ends of the extensions or guides 30 having substantially oval cross-sectional shaped body portions, in the shape of a circular notch or groove 100 for receiving a portion of the flexible part of an electrical power cord, such as the flexible portions 200, 205 of the power cords illustrated in FIG. 7. In order to further restrict movement and retain the flexible portions 200, 205 within the notch or grooves 100, the ends of the extensions or guides 30 are formed with retention fingers, clasps or other mechanisms 105 through which the flexible portions 200, 205 may pass and remain entrapped in the notch or grooves 100 until a user pulls the flexible portions 200, 205 through the mechanisms 105 to free the flexible portions 200, 205 from the recesses 100.

Figure 8:
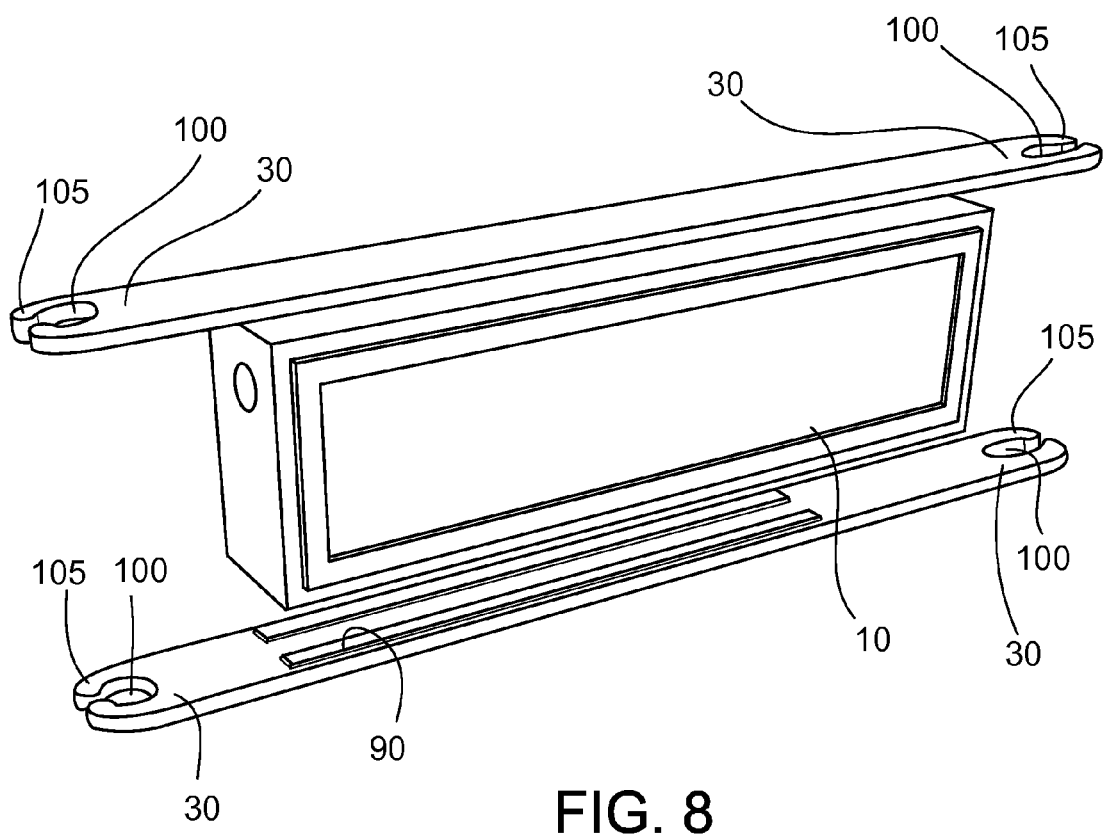
FIG. 8 illustrates another implementation of a cord wrap for a power supply unit.

FIG. 8 shows an alternative implementation of the extensions or guides 30 of FIGS. 3A and 3B. As illustrated in FIG. 8, instead of the extensions or guides 30 including notches or openings 60 as discussed above with respect to FIGS. 3A and 3B, the guides 30 may include recesses formed in the shape of a circular notch or groove 100 for receiving a portion of the flexible part of an electrical cord (not shown). Like the implementation shown in FIG. 7, in order to further restrict movement and retain the flexible portions 200, 205 within the notch or grooves 100, the ends of the extensions or guides 30 are formed with retention mechanisms 105 in a similar manner as described above with respect to the implementation of FIG. 7.

Figure 8A:
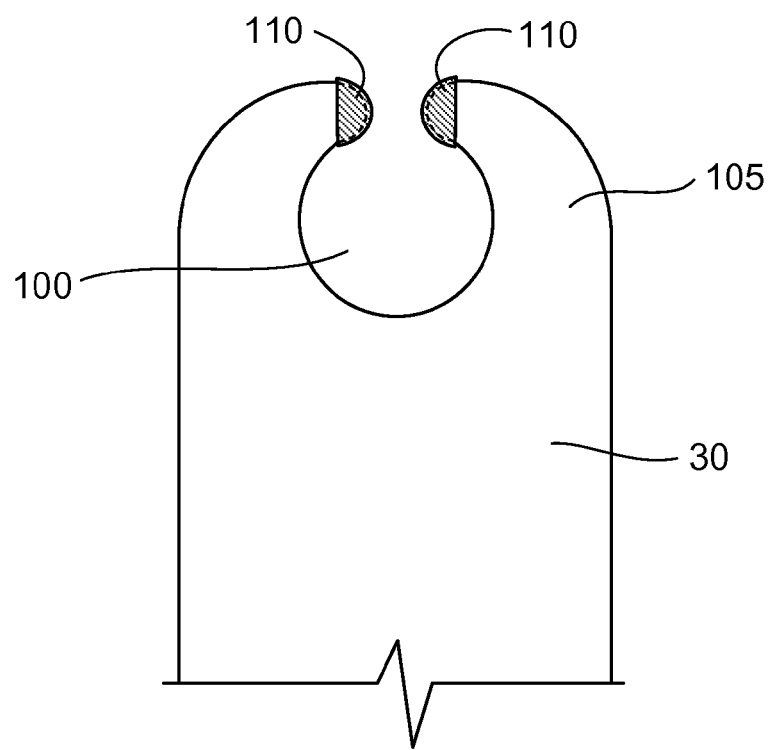
FIGS. 8A-8D illustrate alternative implementations of the cord wrap of FIG. 8.
Figure 8B:
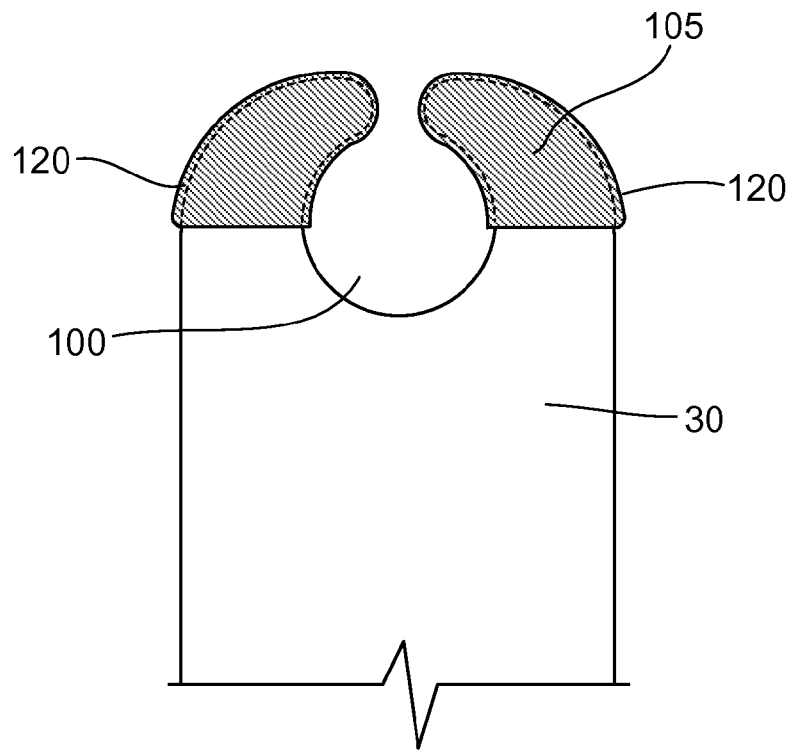
Figure 8C:
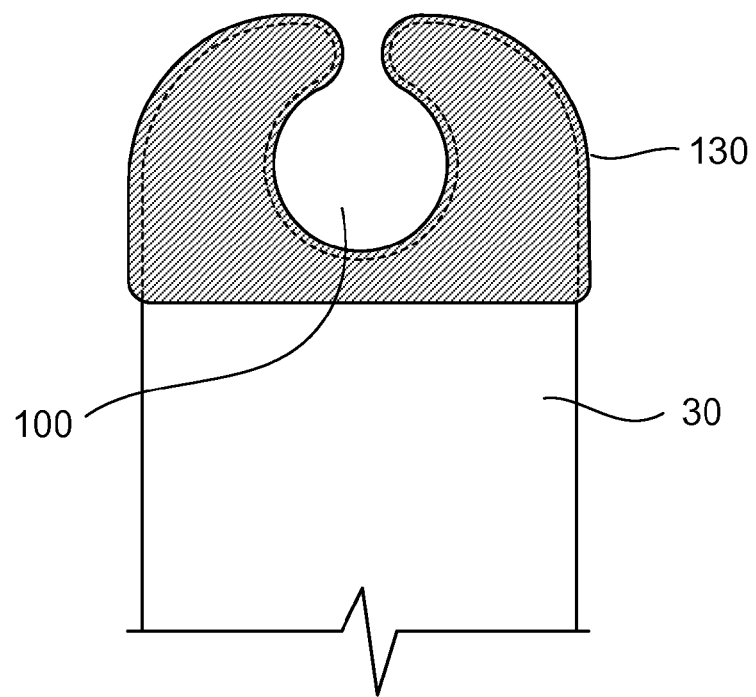
Figure 8D:
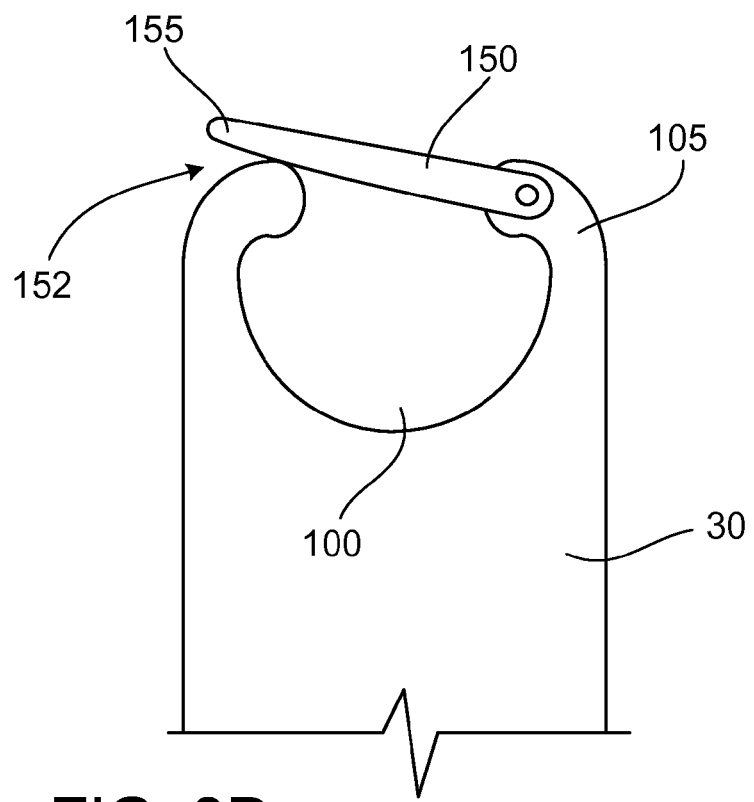

FIGS. 8A-8C illustrate various alternative implementations of elements that may be used in conjunction with the retention mechanisms 105 of FIG. 8 to allow for the accommodation of varying sizes of electrical cords and/or wires and to assist in the insertion, retention, and removal of the cords and/or wires in/from the notches or grooves 100. Referring to FIG. 8A, one or more tips or caps 110 may be placed over or around an end or tip portion of the retention mechanisms 105. The tips or caps 110 may be made from a soft or flexible rubber or elastic material or may be made from a plastic material. Referring to FIG. 8B, one or more jackets 120 may be placed over or around a portion of the retention mechanisms 105. As shown in FIG. 8B, the jackets 120 surround a larger portion of the retention mechanisms 105 as compared to the tips 110 of FIG. 8A. Like the tips 110, the jackets 120 may be made from a soft or flexible rubber or elastic material or may be made from a plastic material. Referring to FIG. 8C, a jacket 130 may be placed over or around a portion of the retention mechanism 105 and a portion of the end of the extension or guide 30. As shown in FIG. 8C, the jacket 130 surrounds substantially all of the retention mechanism 105 and a part of the end portion of the guide 30, while providing full coverage of the portion of the guide 30 forming the circular notch or groove 100. Like the jackets 120, the jacket 130 may be made from a soft or flexible rubber or elastic material or may be made from a plastic material. The tips or caps 110 (FIG. 8A), the jackets 120 (FIG. 8B), and the jackets 130 (FIG. 8C) may be attached to the retention mechanisms 105 using an adhesive or other suitable bonding material or may be formed integrally with the retention mechanism 105, via, for example, a molding or other suitable process. Alternatively, the tips and jackets may be slid onto the retention mechanisms 105 and held by, for example, a friction fit, and removable for cleaning or replacement. Referring to FIG. 8D, a spring-loaded clip or clasp 150 may be rotatably coupled to one of the retention mechanisms 105. The clip 150 is formed such that when the clip 150 is in the closed position, a space 152 is formed between the clip 150 and an outer edge of the retention mechanism 105 at the end of the guide 30. When a user desires to capture a portion of an electrical cord or wire (not shown) within the opening 100 of the guide 30, the user can slide the cord along the outer surface of the guide 30 into the space 152 and contact an end portion 155 of the clip 150. The clip 150 will rotate in a clockwise position to permit the cord to be positioned within the opening 100 of the guide 30. Once the cord is within the opening 100, the clip 150 will return to its closed position (FIG. 8D), and because it is biased against opening, the clip 150 will assist in retaining the cord within the opening 100 of the guide 30.

Figure 9A:
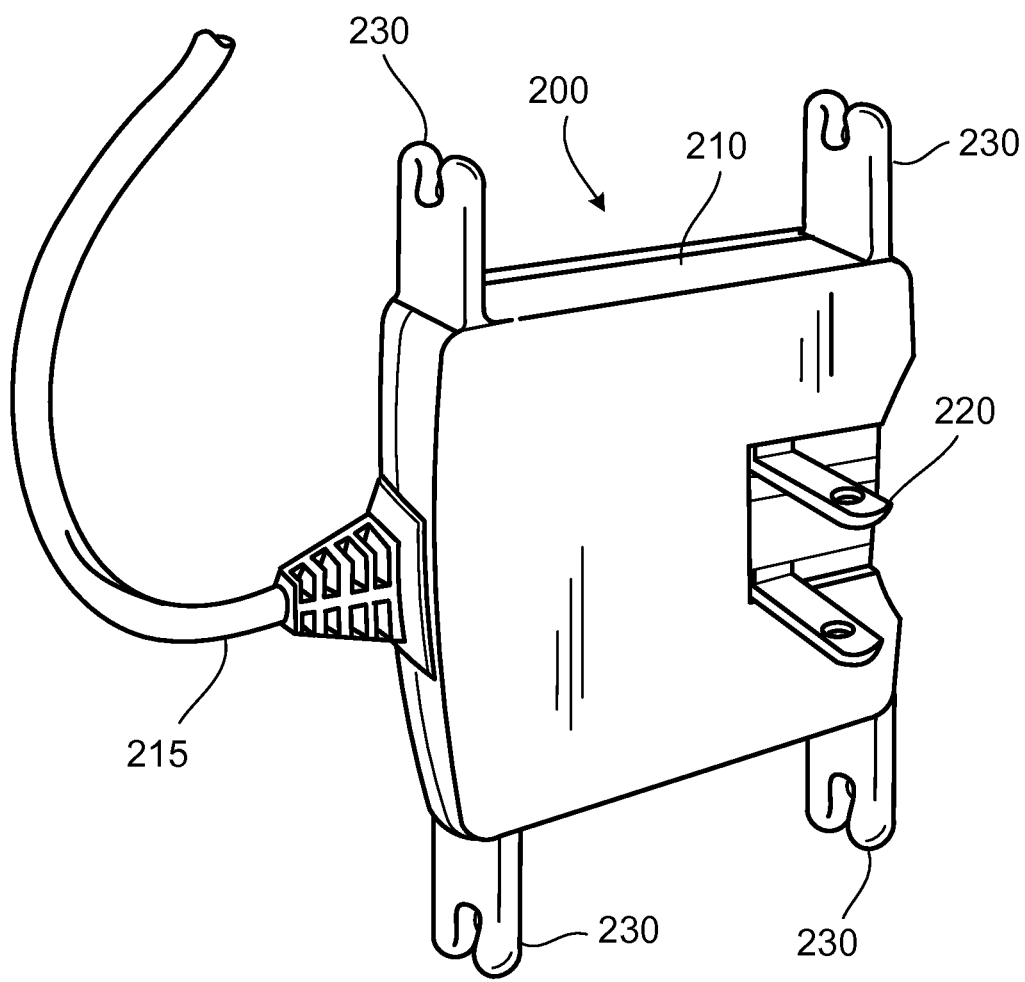
FIGS. 9A-9C illustrate other implementations of a cord for a power supply unit.
Figure 9B:
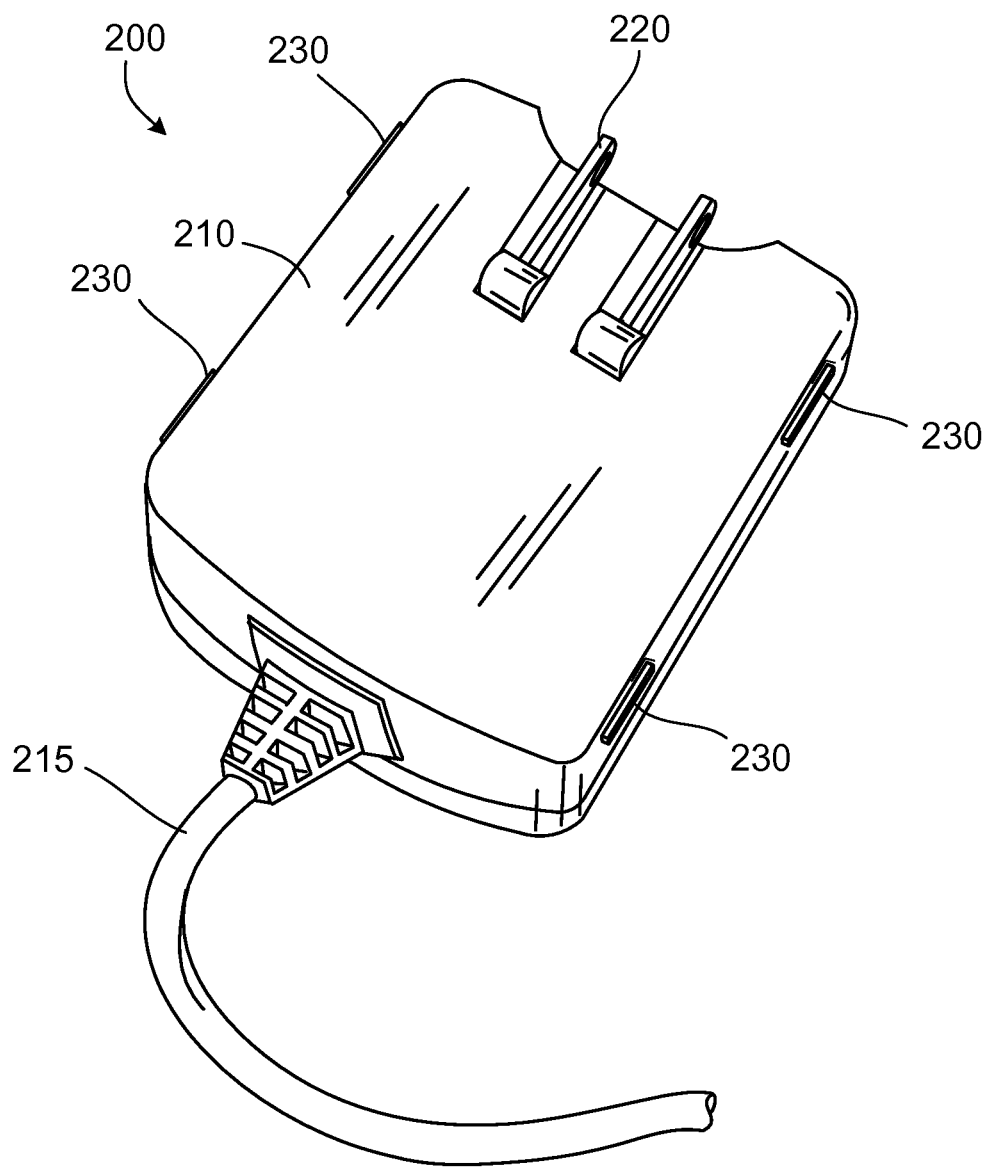
Figure 9C:
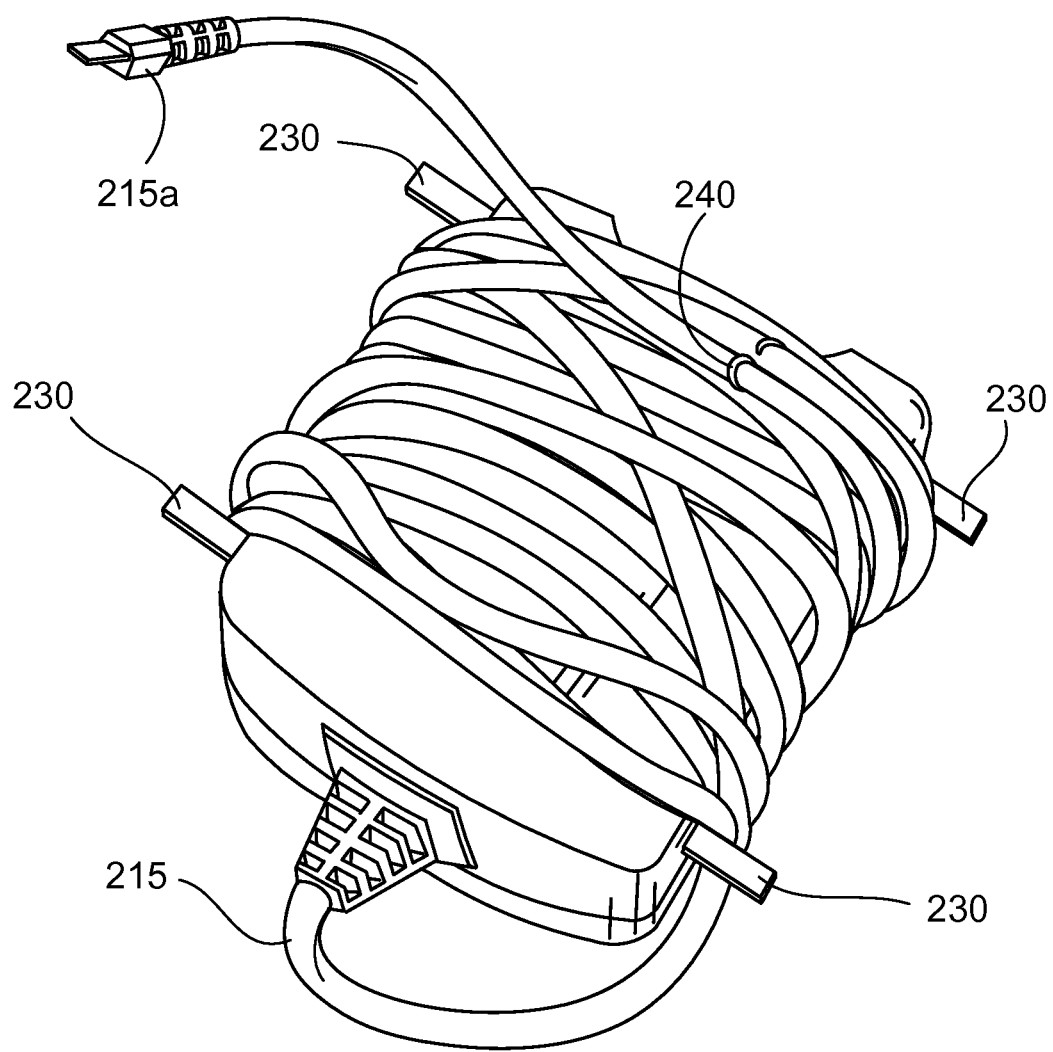

FIGS. 9A-9C illustrate alternative implementations of a cord wrap assembly 200 for use with a power supply unit 210. As illustrated in FIGS. 9A-9C, the power supply unit 210 includes electrical prongs 220, which may be plugged into, for example, a wall outlet. The prongs 220 are movable between an open or extended position (FIG. 9A) and a closed position (FIGS. 9B, 9C). Including the prongs 220 as part of the power supply unit 210 eliminates the need for an additional high voltage power cord as discussed above. A low voltage power cord 215 may also be connected, or releasably connected, at one end to the power supply unit 210 and at an opposite end of the cord 215 to a receiving port formed in an electronic device, such as, for example, a laptop computer, phone, or wireless router device. As shown in FIG. 9C, the cord 215 may include a connecter 215a, such as a Universal Serial Bus (USB) connector, formed at one of its ends for connecting to a mating USB receiving port (not shown) in the electronic device.

As shown in FIG. 9A, the power supply unit 210 may include one or more extensions or guides 230 formed integral with the body of the power supply unit 210 and formed with openings for receiving a portion of the power cord 215 as discussed above. Alternatively, the guides 230 may be removably attached to the power supply unit 210 as described above. Referring to FIGS. 9B and 9C, the extensions or guides 230 may be attached or disposed on the power supply unit 210 such that they are movable between a closed position when not in use (FIG. 9B) and an open or extended position (FIG. 9C). The extensions or guides 230 may extend beyond the outer periphery of the power supply unit 210 for a desired length, for example, 25.4 mm to 50.8 mm (1 to 2 inches) or less, depending upon the length of the power cord used and the dimensions of the particular power supply unit 210. Referring to FIG. 9C, using the power supply unit 210 as a core or base, the power cord 215 may be wound around the power supply unit 210, for example, in a longitudinal or transverse direction around the power supply unit 210, such that the cord 215 is held in place between the guides 230 at opposite ends of the power supply unit 210. Once the cord 215 is wound around the power supply unit 210, a clip 240, which is slidably or permanent attached to a portion of the power cord 215 may be used to retain another portion of the cord 215 as shown in FIG. 9C. Alternatively, one or more of the extensions or guides 230 may include a recess, such as a notch or other opening as discussed above to assist in retention of the cord 215 in a wrapped configuration about the power supply unit 210. Alternatively, a clip, such as clip 95 (FIG. 4A, 4B), may be provided on one or more of the extensions or guides 230 or the power supply unit 210 to assist in retention of the cord in a wrapped configuration about the power supply unit 210.

A number of implementations and alternatives have been described. Nevertheless, it will be understood that various modifications may be made without departing from the spirit and scope of the disclosure. For example, although the extension or guides 30 are shown as substantially flat longitudinally extending elements, the extensions or guides 30 may have any suitable shape such as cylinders, oval cross-sectional, rectangular cross-sectional, or other shapes and configurations to optimize management, retention or storage of the power supply cord with the power supply unit 10. Moreover, although the extensions or guides 30 are shown extending from the body of the power supply unit 10, the extensions or guides 30 may be disposed within the body when not in use and moved to a position extending away from the body when in use. For example, the extensions or guides 30 may reside in mating pockets formed in the power supply unit 10 when not in use, and triggered, by the push of a button or manually to extend from the power supply unit 10. Moreover, the extensions or guides 30 may be made from any suitable materials, such as plastic, metals, or applicable material, such as polycarbonate resin thermoplastics, such as Lexan™. In addition, although the cord wrap of, for example, FIG. 1 has been shown with notches or grooves 60 formed in each of the guides 30, the cord wrap can be formed with only one guide 30 having a groove 60, or with grooves 60 formed in the ends of two or more of the guides 30.

In addition, although the retention mechanisms 105 shown in FIGS. 7 and 8 were depicted as retention fingers or extensions of guides 30 forming substantially circular openings 100, other configurations are available. For example, FIGS. 10A-10E illustrate various implementations of alternative retention mechanisms 1005. In the implementation shown in FIG. 10A, the retention mechanism 1005 includes a first substantially linear portion 1010 extending from an end portion of the guide 30 substantially parallel to a longitudinal axis L of the guide 30, and a curved portion 1020 terminating proximate to the linear portion 1010. The curved portion 1020 includes a first portion 1021 that extends substantially parallel to the longitudinal axis L of the guide 30 for a portion of its length and a second curved portion 1022 which extends for a portion of its length substantially perpendicular to the longitudinal axis L of the guide 30 before terminating in a portion 1023, which is substantially parallel to the longitudinal axis L and the linear portion 1010. The portion 1023 and the linear portion 1010 cooperate to form a passageway 1015 through which an electrical cord or wire (not shown) may be passed for insertion into and removal from the opening 100.

Figure 10A:
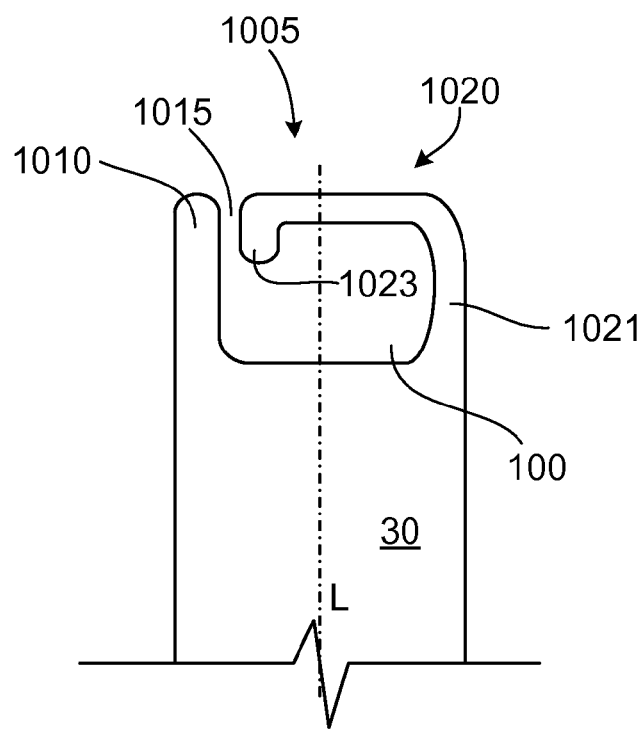
FIGS. 10A-10F illustrate alternative implementations of the retention mechanisms of FIGS. 7 and 8.
Figure 10B:
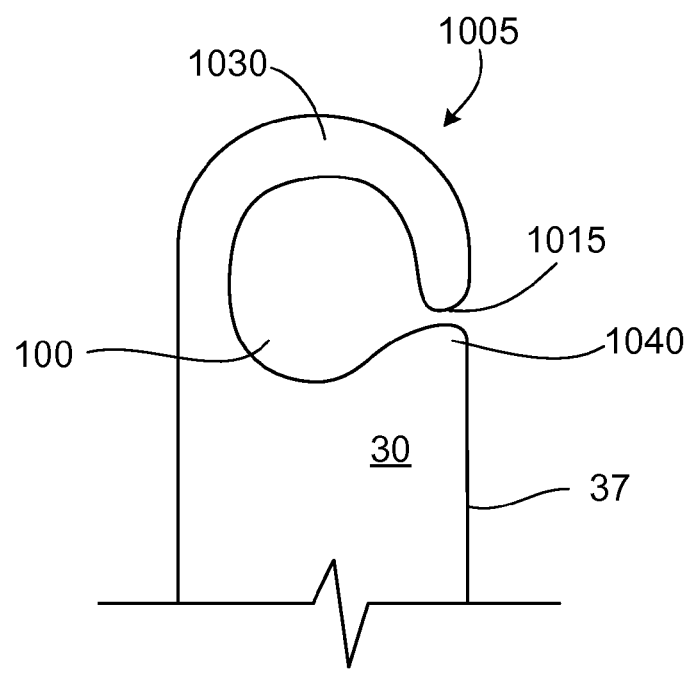
Figure 10C:
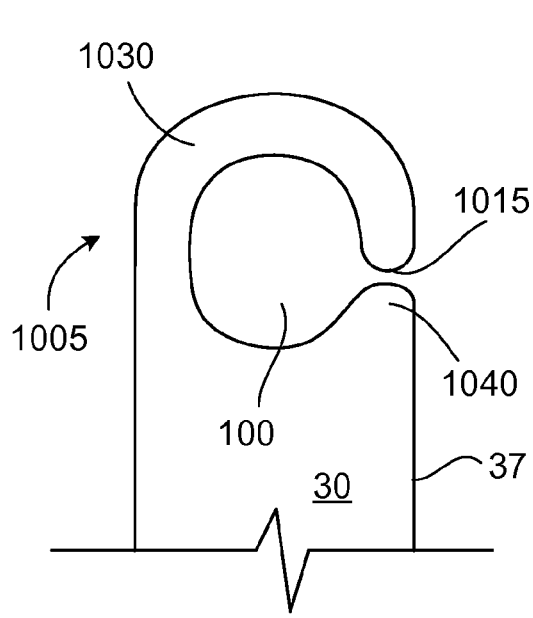
Figure 10D:
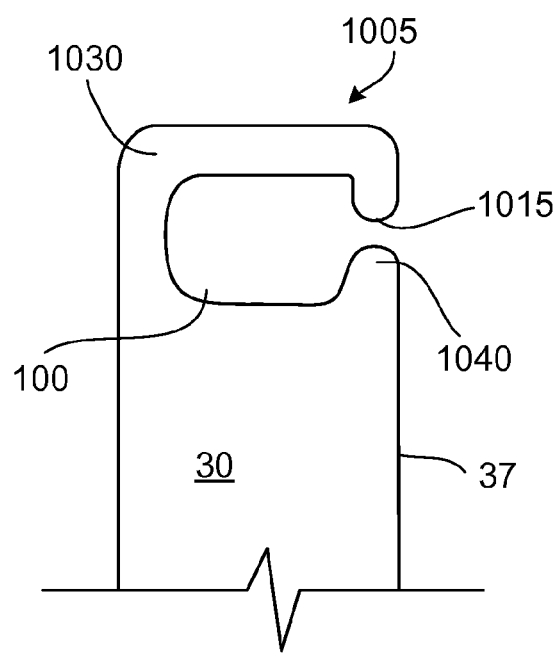
Figure 10E:
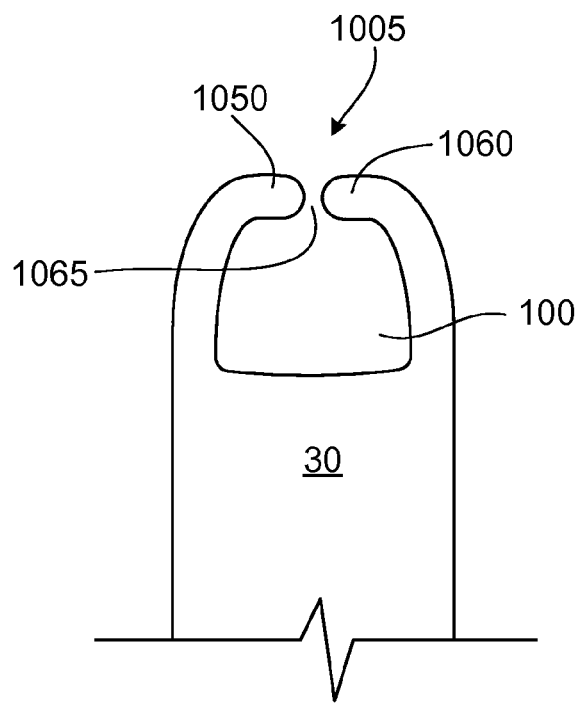
Figure 10F:
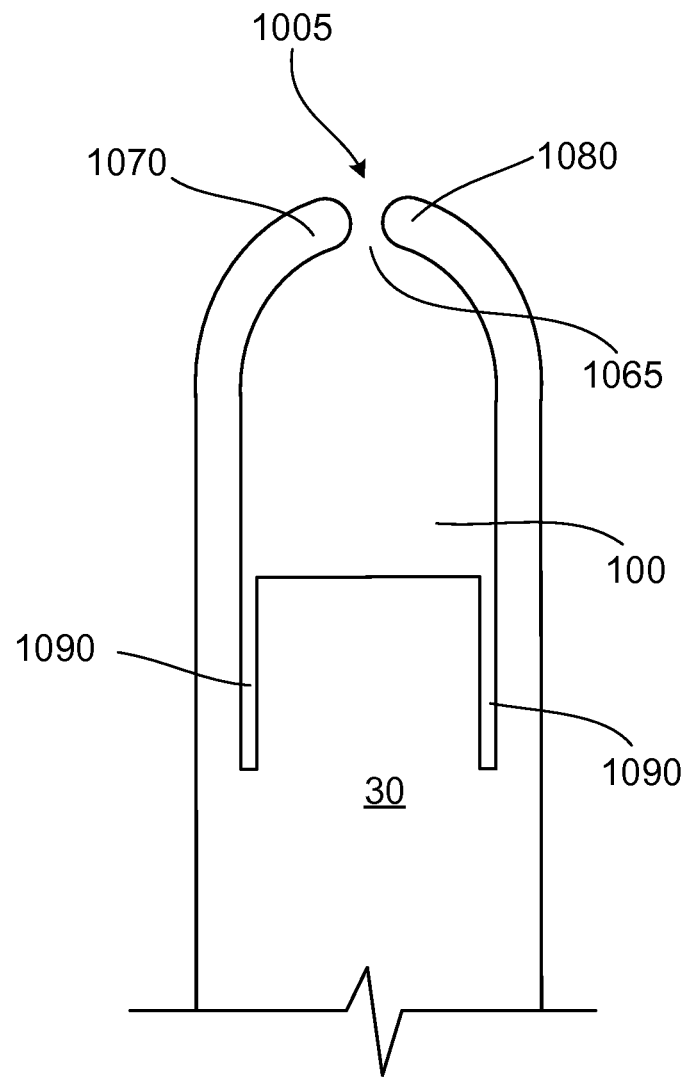

Referring to FIGS. 10B-10D, the retention mechanism 1005 includes a first substantially curved portion 1030 extending from an end portion of the guide 30 and a second portion 1040 in the form of a bump, knub, hump, or short extension of an end portion of the guide 30. The first portion 1030 and the second portion 1040 cooperate to form a passageway 1015 through which an electrical cord or wire (not shown) may be passed for insertion into and removal from the opening 100. The first portion 1030 and the second portion 1040 also cooperate to form a substantially C-shaped retention mechanism 1005 with a substantially circular opening (FIGS. 10B, 10C) or a rounded-rectangular opening (FIG. 10D). In the implementations shown in FIGS. 10B-10D, unlike the previous implementations, such as FIG. 10A, which shows the passageway 1015 for the cord or wire formed at a distal end or tip of the extension or guide 30, the passageways 1015 formed by the portions of the retention mechanisms 1005 of FIGS. 10B-10D are formed in a side 37 of the guide 30. Referring to FIG. 10E, an alternative guide mechanism 1005 is shown having first and second substantially curved portions 1050, 1060 extending from an end of the guide 30 and terminating proximate each other to form a passageway 1065 leading into opening 100. The curved portions 1050, 1060 are substantially thinner and in some implementations can be longer than, for example, the guide mechanisms 105 of FIG. 8. Thinner portions 1050, 1060 can provide added flexibility, which may assist in easing the insertion and removal of the cord or wire from the opening 100. FIG. 10F illustrates yet another alternative guide mechanism 1005 that includes first and second longitudinally extending and curved portions 1070, 1080 extending from an end portion of the guide 30 and terminating proximate each other to form the passageway 1065 leading into opening 100. The portions 1070, 1080 may extend further in a longitudinal direction, as compared to, for example, the portions 1050, 1060 of FIG. 10E, away from the end portion of the guide 30, such that the opening 100 is extended in a direction substantially along a longitudinal axis of the guide 30 as compared to, for example, the opening 100 of FIG. 10E. In order to provide additional flexibility between the portions 1070, 1080, one or more grooves or notches 1090 may be formed proximate the longitudinally extending portions 1070, 1080 at an end portion of the guide 30. For example, as an electrical wire is being passed through the passageway 1065, the notches 1090 allow the portions 1070, 1080 to flex or rotate through an arc or along a plane that is either substantially orthogonal or substantially parallel to the longitudinal axis of the guide 30 (e.g., along or out of the plane of the extension or guide 30) thereby assisting in the placement and removal of the wire into and from, respectively, the opening 100. It should be understood that each of the guide mechanisms discussed above may be able to flex or rotate in a similar manner.

Accordingly, other implementations are within the scope of the disclosure.

What is claimed is:

1. An apparatus comprising:
   a power supply unit comprising a top surface, a bottom surface, a first pair of opposing side surfaces, and a second pair of opposing side surfaces, the first and second pair of opposing side surfaces disposed between the top surface and the bottom surface; and
   a plurality of substantially planar extensions configured to be coupled to the second pair of opposing side surfaces of the power supply unit such that when coupled to the power supply unit, the plurality of extensions extend outwardly from and transverse to the first pair of opposing side surfaces of the power supply unit, the extensions cooperating with the first pair of opposing side surfaces of the power supply unit to form open channels between the first pair of opposing side surfaces and the extensions such that an electrical power cord can be wrapped around the power supply unit and held in place against the first pair of opposing side surfaces and between the extensions within the open channels, wherein no portion of the open channels is formed by the second pair of opposing side surfaces, wherein at least one end of each of the plurality of extensions defines a recess in the at least one end that is configured to receive and retain a part of a flexible portion of the electrical power cord, wherein the at least one end of each of the plurality of extensions further defines retention mechanisms for retaining the part of the flexible portion of the electrical power cord within the recess, and wherein the plurality of extensions have widths that are substantially the same as widths of the second pair of opposing side surfaces of the power supply unit.

2. The apparatus of claim 1, further comprising a flexible element coupled to the retention mechanisms.

3. The apparatus of claim 2, wherein the flexible element comprises tips made from a rubber or a plastic.

4. The apparatus of claim 3, wherein the tips are bonded to the retention mechanisms or the tips are formed integrally with the retention mechanisms.

5. The apparatus of claim 1, further comprising a flexible element comprising a single jacket, the single jacket configured to substantially surround each of the retention mechanisms.

6. The apparatus of claim 1, wherein the retention mechanisms comprise a first substantially linear portion extending substantially parallel to a longitudinal axis of the at least one of the plurality of extensions and a substantially curved portion terminating proximate to the linear portion.

7. The apparatus of claim 6, wherein the substantially curved portion includes a first portion that extends substantially parallel to the longitudinal axis of the at least one of the plurality of extensions for a portion of its length and a second curved portion that extends for a portion of its length substantially perpendicular to the longitudinal axis of the at least one of the plurality of extensions before terminating in a portion that is substantially parallel to the longitudinal axis of the at least one of the plurality of extensions.

8. The apparatus of claim 1, wherein the retention mechanisms comprise a first substantially curved portion extending from the at least one end of each of the plurality of extensions and a second raised portion extending from the at least one end of each of the plurality of extensions.

9. The apparatus of claim 8, wherein the first substantially curved portion and the second raised portion cooperate to form a passageway in a side of the extension for receiving a part of the flexible portion of the electrical power cord.

10. The apparatus of claim 1, wherein the retention mechanisms comprise a first portion having a longitudinally extending and a curved portion and a second portion having a longitudinally extending and a curved portion, the first and second portions extending from an end portion of the at least one end of each of the plurality of extensions and terminating proximate each other to form a passageway leading into the recess defined between the first and second portions.

11. The apparatus of claim 10, wherein the retention mechanisms are flexible so as to permit the retention mechanisms to flex to allow passage of the power cord through the passageway and into the recess.

12. The apparatus of claim 10, further comprising one or more grooves defined in an end portion of the at least end portion of the guide proximate the first and second portions.

13. The apparatus of claim 12, wherein the one or more grooves are configured to permit the first or second portions to flex along or out of a plane defined by the at least one of the plurality of extensions.

14. An apparatus comprising:
   at least two longitudinally extending and substantially planar guides configured to be coupled to a first pair of opposite side surfaces of a power supply unit such that, when coupled to the first pair of opposite side surfaces of the power supply unit, the guides cooperate with each other and with a second pair of opposite side surfaces of the power supply unit to form open channels between the guides such that an electrical power cord can be wrapped around the power supply unit and held in place against the second pair of opposite side surfaces of the power supply unit and between the guides within the open channels, wherein widths of the two longitudinally extending guides are substantially the same as widths of the first pair of opposite side surfaces of the power supply unit, wherein no portion of the open channels is formed by the first pair of opposite side surfaces, and wherein at least one end of each of the guides defining a recess in the at least one end that is configured to receive and retain a part of a flexible portion of an electrical power cord and to cooperate with the power supply unit to retain the power cord in a wrapped arrangement substantially within the channel, and retention mechanisms cooperating with the recess to receive and retain the part of the flexible portion of the electrical power cord.

15. The apparatus of claim 14, wherein the retention mechanisms comprise a first portion having a longitudinally extending and a curved portion and a second portion having a longitudinally extending and a curved portion, the first and second portions extending from an end portion of the at least one end of each of the guides and terminating proximate each other to form a passageway leading into the recess between the first and second portions.

16. The apparatus of claim 15, wherein the retention mechanisms are flexible so as to permit the retention mechanisms to flex to allow passage of the power cord through the passageway and into the recess.

17. The apparatus of claim 15, further comprising one or more grooves defined in an end portion of the at least one end of each of the guides.

18. The apparatus of claim 17, wherein the one or more grooves are configured to permit the first or second portions to flex along or out of a plane defined by the at least one of the guides.

19. The apparatus of claim 14, wherein the retention element comprises a textured surface disposed within the at least one end of each of the guides defining the recess.

20. The apparatus of claim 14, wherein the retention element comprises an insert defining a plurality of textured portions disposed within the at least one end of each of the guides and the insert is bonded to the at least one end of the guides or is formed integral with the at least one end of the guides.

21. The apparatus of claim 14, wherein when coupled to the first pair of opposite side surfaces of the power supply unit, the two longitudinally extending guides cover substantially all of the first pair of opposite side surfaces to which the two longitudinally extending guides are coupled.

* * * * *